(12) United States Patent
Morris et al.

(10) Patent No.: US 6,691,173 B2
(45) Date of Patent: Feb. 10, 2004

(54) DISTRIBUTED MANAGEMENT OF AN EXTENDED NETWORK CONTAINING SHORT-RANGE WIRELESS LINKS

(75) Inventors: Martin Morris, San Diego, CA (US); Rajiv Kumar, San Diego, CA (US); Lyn Nguyen, San Diego, CA (US); Hiep Pham, San Diego, CA (US)

(73) Assignee: Widcomm, Inc., San Diego, CA (US)

( * ) Notice: Subject to any disclaimer, the term of this patent is extended or adjusted under 35 U.S.C. 154(b) by 0 days.

(21) Appl. No.: 09/347,894

(22) Filed: Jul. 6, 1999

(65) Prior Publication Data

US 2003/0149794 A1 Aug. 7, 2003

(51) Int. Cl.$^7$ ............................................... G06F 15/14
(52) U.S. Cl. ..................................................... 709/249
(58) Field of Search ................................. 709/249, 218

(56) References Cited

U.S. PATENT DOCUMENTS

| | | | |
|---|---|---|---|
| 5,490,139 A | 2/1996 | Baker et al. | 370/60 |
| 5,572,528 A | 11/1996 | Shuen | 370/85.13 |

(List continued on next page.)

FOREIGN PATENT DOCUMENTS

| | | |
|---|---|---|
| EP | 0695059 A1 | 1/1996 |
| WO | WO 99 14897 A | 3/1999 |
| WO | WO 99/14897 | 3/1999 |

OTHER PUBLICATIONS

Bluetooth Adopter's website: "Specification of the Bluetooth System" v.0.8 Jan. 22, 1999 (pp. 1–224).

(List continued on next page.)

*Primary Examiner*—Frantz B. Jean
(74) *Attorney, Agent, or Firm*—Cooley Godward LLP (57) ABSTRACT

A method and apparatus for internetworked communication between first and second wireless networks containing first and second pluralities of wireless nodes, respectively, is disclosed herein. In a preferred implementation an internetworking node participates in both the first and second wireless networks, and receives a first set of network information identifying each of the first plurality of wireless nodes and the services offered thereby. The internetworking node is configured to transmit the first set of network information to a master node of the second wireless network. The internetworking node also receives, from the second wireless network, a second set of network information identifying each of the second plurality of wireless nodes and the services offered thereby. In addition, the internetworking node may also transmit the second set of network information to a master node of the first wireless network. The first master node may be configured to broadcast information relating to the services offered by each of the first plurality of wireless nodes and the second wireless network. Likewise, the second master node may be configured to broadcast information relating to the services offered by each of the second plurality of wireless nodes and the second wireless network. In a preferred embodiment each of the first plurality of wireless nodes transmits an advertisement to the first master node specifying its address and services offered thereby. Similarly, each of the second plurality of wireless nodes transmits an advertisement to the second master node specifying its address and services offered thereby.

24 Claims, 5 Drawing Sheets

U.S. PATENT DOCUMENTS

| | | | | |
|---|---|---|---|---|
| 5,636,216 | A | | 6/1997 | Fox et al. .................... 370/402 |
| 5,652,751 | A | | 7/1997 | Sharony ..................... 370/227 |
| 5,654,959 | A | * | 8/1997 | Baker et al. ................. 370/331 |
| 5,696,903 | A | | 12/1997 | Mahany |
| 5,699,353 | A | | 12/1997 | Kent .......................... 370/315 |
| 5,708,655 | A | | 1/1998 | Toth et al. .................. 370/313 |
| 5,742,598 | A | | 4/1998 | Dunn et al. ................. 370/393 |
| 5,754,547 | A | | 5/1998 | Nakazawa .................. 370/401 |
| 5,812,531 | A | | 9/1998 | Cheung et al. ............. 370/255 |
| 5,825,772 | A | | 10/1998 | Dobbins et al. ............ 370/396 |
| 5,835,061 | A | | 11/1998 | Stewart ...................... 342/457 |
| 5,845,081 | A | | 12/1998 | Rangarajan et al. ... 395/200.54 |
| 5,850,592 | A | | 12/1998 | Ramanathan |
| 5,854,899 | A | | 12/1998 | Callon et al. .......... 395/200.68 |
| 5,901,362 | A | * | 5/1999 | Cheung et al. ............. 370/338 |

OTHER PUBLICATIONS

Geneseo.edu—website: "PMDF System Manager's Guide—PMDF–REF–5.1; Overview of PMDF" (pp. 1 of 1; 1 of 2 and 2 of 2).

Haartsen, Jaap, "Bluetooth—the universal radio interface for ad hoc, wireless connectivity", Ericsson Review, Se, Ericsson (3):110–117, (1998).

Haartsen, Jaap, "Bluetooth–The universal radio interface for *ad hoc*, wireless connectivity," *Ericsson Review*, No. 3, pp. 110–117, (1998).

Haartsen, Jaap, "Bluetooth–The universal radio interface for *ad hoc*, wireless connectivity," *Ericsson Review*, No. 3, pp. 110–117, (1998).

"Specification of the Bluetooth System, Core, Version 1.0B," *Bluetooth SIG Specifications*, pp. 18–42, (Dec. 1, 1999).

* cited by examiner

DISTRIBUTED MANAGEMENT OF AN EXTENDED NETWORK CONTAINING SHORT-RANGE WIRELESS LINKS

FIELD OF THE INVENTION

The present invention generally pertains to wireless networks, and more particularly to methods for internetworking between such networks.

BACKGROUND OF THE INVENTION

Computer networks allow multiple computers, peripherals and other information storage, retrieval or processing devices to share data. Each device attached to a network is typically referred to as a node on the network, or a node that is part of the network. Local Area Networks ("LANs") have historically consisted of nodes interconnected by physical telecommunications media (eg, coaxial cable, twisted pair wire, or fiber optics). Recently wireless LANs, the nodes of which are not connected by means of a physical medium, have started to appear in the market. These wireless LANs communicate by means of infra-red (IR), radio or other signals. One of the benefits of using wireless LANs is that cabling is not required. This is a particularly useful feature for mobile nodes such as laptop and notebook computers, PDAs (personal digital assistants), and the like. If appropriately equipped with an appropriate wireless adapter, the mobile nodes can move around within a predefined coverage area and remain connected to the network.

One method of implementing a wireless LAN is similar to a cellular phone network system. In this method wireless mobile nodes do not communicate directly with each other, but rather send all signals to a central base station, which then redirects the signals to the destination node. In certain systems of this type each wireless mobile node is allowed to simultaneously participate in different wireless networks. However, current approaches do not provide for communication between wireless nodes of different wireless LANs, even though both such nodes may be in range of a third wireless node included within both networks.

In a "peer-to-peer" wireless LAN, data packets transmitted by a node are received by all nodes within range. Packets are ignored by all nodes except those to which the packets are addressed. This parallels the packet delivery systems of such wired LAN protocols as Ethernet. However, the limited range of wireless nodes makes it much more difficult to implement a wireless, in lieu of a wired, peer-to-peer wireless LAN. For example, in a peer-to-peer wireless LAN it cannot be guaranteed that each node of a given network is capable of listening to all network traffic. That is, certain nodes may become "hidden" from others when moved outside of existing coverage areas.

In view of the constraints on transmission range applicable to both peer-to-peer and other types wireless LANs, it would be desirable to facilitate communication between the nodes of distinct wireless LANs. However, any implementation affording such "internetworked" communication capability would need to overcome a number of difficulties. For example, the high mobility, limited range, and power-saving features (e.g., sleep modes) characterizing many devices served by wireless LANs tend to limit the awareness of such devices to significant network events. The high mobility of many such devices also complicates the process of identifying the location of a desired partner communication device within a neighboring wireless LAN.

SUMMARY OF THE INVENTION

Briefly, therefore, this invention provides for a method and apparatus for internetworked communication. The present invention includes first and second wireless networks containing first and second pluralities of wireless nodes, respectively. In a preferred embodiment an internetworking node participates in both the first and second wireless networks, and receives a first set of network information relating to the first wireless network from the first plurality of wireless nodes. The first set of network information identifies each of the first plurality of wireless nodes and the services offered thereby. The internetworking node is configured to transmit the first set of network information to a master node of the second wireless network. In a preferred embodiment the internetworking node receives, from the second wireless network, a second set of network information identifying each of the second plurality of wireless nodes and the services offered thereby. The internetworking node may also transmit the second set of network information to a master node of the first wireless network.

The first master node may be configured to broadcast information relating to the services offered by each of the first plurality of wireless nodes and the second wireless network. Likewise, the second master node may be configured to broadcast information relating to the services offered by each of the second plurality of wireless nodes and the second wireless network. In a preferred embodiment each of the first plurality of wireless nodes transmits an advertisement to the first master node specifying its address and services offered thereby. Similarly, each of the second plurality of wireless nodes transmits an advertisement to the second master node specifying its address and services offered thereby. The first and second master nodes store information from each received advertisement within first and second network resources tables, respectively. This enables a wireless node from the first network to obtain services from the second wireless network, and vice versa, by way of the internetworking node. In a preferred implementation the internetworking node only advertises the services available within the first or second wireless networks to the extent it currently possesses sufficient bandwidth to support provision of such services to nodes within the other wireless network.

In an alternate embodiment the first and second wireless networks do not share a common internetworking node, but may communicate through an interconnection network operatively connected to at least one node of each network. The connected node of the first wireless network issues an advertisement which includes a description of the services offered by the second wireless network, and the connected node of the second wireless network issues an advertisement which includes a description of the services offered by the first wireless network. The first and second master nodes store information from each received advertisement within first and second network resources tables, respectively.

DETAILED DESCRIPTION OF THE INVENTION

The present invention is more fully described with reference to FIGS. 1–5. An exemplary implementation of the invention is discussed and illustrated with reference to its implementation using wireless networks predicated on the proposed "Bluetooth" wireless communications protocol. This protocol contemplates the grouping of physically proximate wireless nodes into "piconets", and is described in *Specification of the Bluetooth System*, v0.8, Jan. 22, 1999 (and in subsequent revisions thereof). It should be understood that this invention is not limited to such a wireless protocol, and could be similarly implemented using other types of wireless networks.

Figure 1:
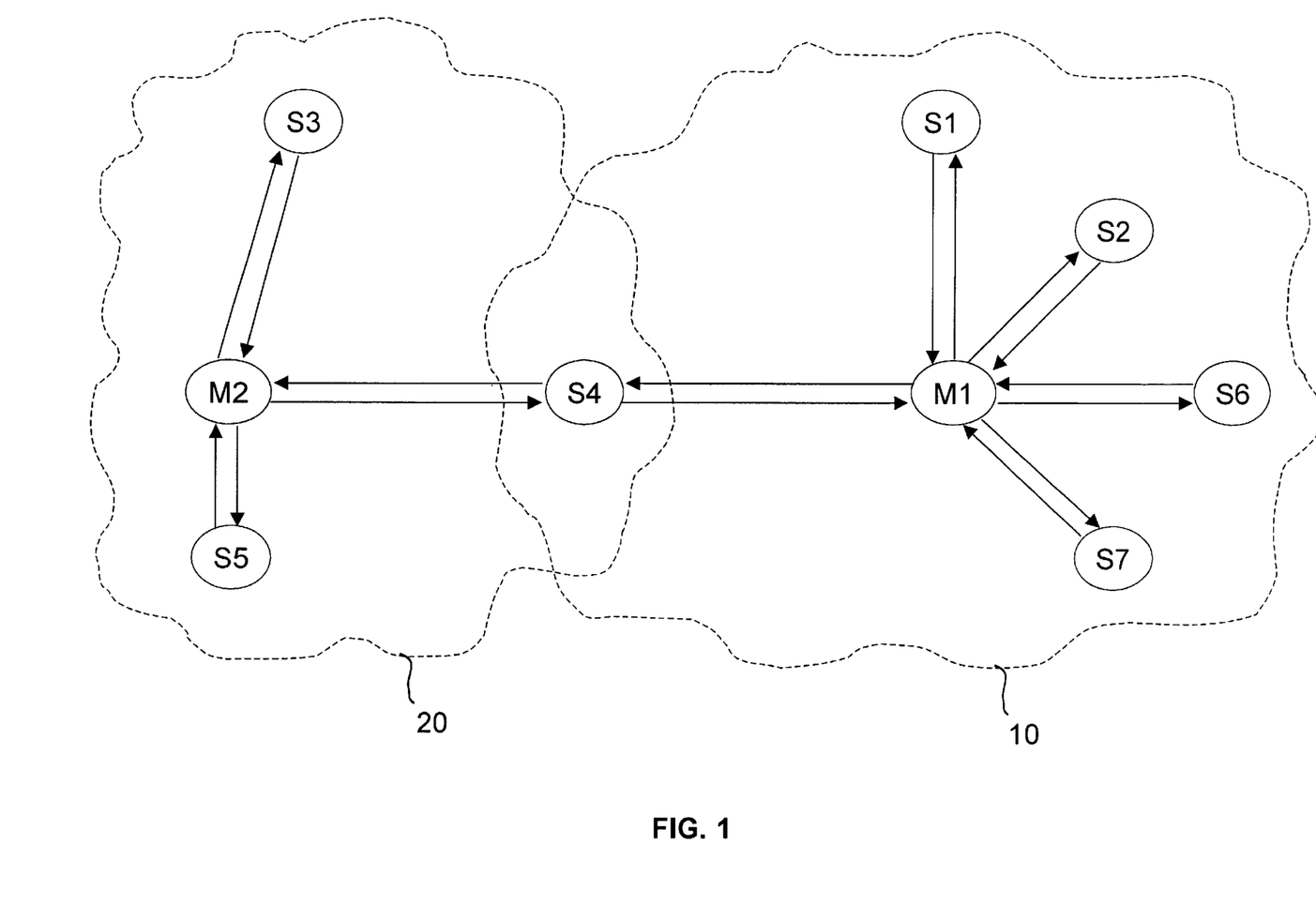
FIG. 1 illustrates a plurality of wireless nodes configured within a first and second piconets in accordance with the present invention.

FIG. 1 illustrates a plurality of wireless nodes included within a first piconet 10 and a second piconet 20. The first piconet 10 is comprised of a master node M1, and of slave nodes S1, S2, S4, S6 and S7. The second piconet 20 contains a master node M2, and slave nodes S3, S4 and S5. For purposes of illustration, it is assumed that certain of the wireless nodes depicted in FIG. 1 are mobile relative to one another. In the piconet architecture of FIG. 1, each slave node within the first piconet 10 is within the coverage area of master node M1 and each slave node within the second piconet 20 is within the coverage area of master node M2. However, slave nodes within the first and second piconets 10 and 20 need not be within transmission range of other slave nodes within their respective networks.

As is discussed below, slave node S4 is a member of both the first and second piconets 10 and 20, and facilitates internetworking therebetween. In this regard internetworking refers to the communication between the first and second piconets 10 and 20 facilitated by the distributed network management system of the present invention. The slave node S4, or "internetworking node", understands the protocols of both the first and second piconets 10 and 20, and is capable of transparently relaying data traffic therebetween.

Because the wireless nodes within the piconets 10 and 20 are not necessarily within transmission range of all the other wireless nodes within the same piconet, each wireless node may not be able to monitor all of the network traffic within its piconet. For example, slave node S2 may be able to "listen" to slave node S1 but may not be able to monitor transmissions from slave node S7. In a preferred implementation each slave node transmits an advertisement identifying its address and the services it offers. Each such advertisement also incorporates the address of all other slave nodes from which advertisements are received by the slave node transmitting a given advertisement. Based on this information, the master node of a piconet can determine all nodes participating in the piconet and the service offered by each. As used herein the term "services" encompasses, without limitation, the capability of a given slave node to relay message information to and from one or more outside networks. Accordingly, the advertisement issued by each slave node may also identify the other networks within which the slave node is capable of communication and the services offered by each.

Based upon the advertisements received from each slave node, the master node of the piconet issues an "internet management broadcast" identifying: (i) the nodes participating in the piconet, (ii) the services offered by each, and (iii) the services offered by each external network accessible to one or more slave nodes of the piconet. In a preferred implementation each slave node capable of communication with an external network will only advertise such capability to the extent it is willing to serve as a conduit for data or message information directed to such network. As an example, consider the case in which internetworking node S4 elects to transmit advertisements within the first piconet 10 describing the services available within the second piconet 20. In this case internetworking node S4 need not necessarily issue reciprocal advertisements within piconet 20; that is, advertisements identifying the services available within piconet 10. Based upon this advertisement from internetworking node S4, slave node S7 may decide to transmit a message to slave node S3 (via master node M1, internetworking node S4, and master node M2). In the preferred implementation internetworking node S4 will also forward (via master node M1) any message response sent by slave node S3 to slave node S7.

In both of the piconets 10 and 20, a small portion of the available spectrum is allocated to the advertisements issued by each slave node and to the internet management broadcasts made by the applicable master node. When a wireless node desires to participate in this internet management protocol, it initially ascertains whether any other wireless node is currently making internet management broadcasts. If an existing internet management broadcast or advertisement is not detected, the wireless node begins periodic transmission of an initial advertisement identifying its address, the services it offers, as well as a handle (i.e., name) for the piconet being formed. The initial advertisement also specifies the operating mode of the initially participating node and the manner in which it may be contacted by other nodes desiring to participate (i.e., the node may only check for reply transmissions at certain times). Another wireless node receiving the initial advertisement and desiring to participate in the piconet will transmit an acknowledgement message notifying the initial wireless node of its identity and the services it offers. Again, the services offered by the newly participating wireless node include its own inherent capabilities, as well as the capabilities of any devices within networks accessible to the newly participating device.

Once the initially participating node has discerned the presence of any newly participating node through receipt of the acknowledgement message, these two nodes will preferably negotiate to determine which should assume the role of periodically issuing the internet management broadcast for the piconet. That is, the two nodes will preferably decide which will become the master node for the piconet and which will become a slave node. In one approach, each node is classified into one of a set of predefined operating modes by considering the node's mobility, power resources, and other parameters bearing upon its suitability to periodically transmit the internet management broadcast. For example, a desktop PC and a handheld wireless device would likely not share the same operating mode in view of their differences in mobility and power resources. In a preferred implementation, the node currently functioning as the master node will compare its operating mode to that of the node from which it receives an advertisement. Should the node issuing the advertisement be of an operating mode deemed to be preferable to the operating mode of the current master node, the current master node relinquishes it status as master node by sending one last internet management broadcast. This last broadcast identifies the address of the new master node, and instructs the new master node to assume the role of periodically issuing internet management broadcasts.

Any wireless node participating in a piconet is free to revoke or modify its advertisement. For example, to the extent internetworking node S4 (FIG. 1) had initially identified its affiliation with the second piconet 20 in its advertisement issued for the first piconet 10, it could omit reference to this affiliation in subsequent advertisements. A wireless node will preferably omit such references to affiliations with other networks from its advertisements to other networks when it determines it would be unable to support additional connections to such network on behalf of requesting devices. For example, if internetworking node S4 only possessed capacity to support connections to the second piconet 20 for three devices within the first piconet 10, it will preferably omit its affiliation with the second piconet 20 in its advertisement for the first piconet 10 upon establishing three such internetworking paths.

A wireless node will generally revoke its advertisement upon recognizing that it is likely to imminently move out of range of the master node for the piconet. In addition, such a node will attempt to notify any devices for which it is currently serving as a "gateway" to an external network of its imminent departure from the piconet. For example, if internetworking node S4 were to determine it would soon move out of range of master node M1 and was currently supporting a connection to the second piconet 20 (e.g., to node S5) for node S6, it would attempt to notify node S6 of its imminent departure from the first piconet 10. Unfortunately, such notification on the part of a device departing from a piconet is not always possible. An abrupt departure from a piconet could occur when a device comprising one of the piconet's wireless nodes is abruptly turned off, or when such a device moves to a location from which communication with the piconet's master node is precluded due to an intervening obstruction. When a node (e.g., node S6) abruptly loses communication with an external network due to the abrupt departure from the piconet of a gateway node (e.g., internetworking node S4), it notifies the applicable master node (e.g., node M1). This master node then implicitly revokes the advertisement for the gateway node, and suggests utilization of an alternate gateway node (if available) for the previously served node (i.e., node S6).

It is also of course possible that the current master node for a piconet could move out of range of one or more slave nodes, or could become precluded from continuing internet management broadcasts due to a loss of power or other device failure. If a slave node does not receive an internet management broadcast when expected, the slave node will preferably attempt to contact the master node to determine if it is currently operational. If such contact is not made and the slave node fails to detect advertisements from any other wireless nodes, the slave node itself assumes the role of master node and commences issuing internet management broadcasts. If the slave node detects other advertisements, it negotiates with the wireless node issuing such advertisements in order to determine which of the two should become the new master node. Upon detecting an internet management broadcast from a new master node, all devices electing to participate as slave nodes provide their existing advertisements to the new master node in order that its database may be established.

When a current master node becomes incapable of continuing internet management broadcasts (e.g., upon moving out of range or experiencing a device failure), it is possible that collisions may occur among the initial internet management broadcasts issued by the slave devices remaining within the piconet. In a preferred implementation only certain of the participating slave nodes are configured to issue an initial internet management broadcast subsequent to departure of the previous master node from the piconet. Alternatively or in addition, any remaining slave nodes designated to begin internet management broadcasts are each permitted to do so only after expiration of a random interval.

Figure 2:
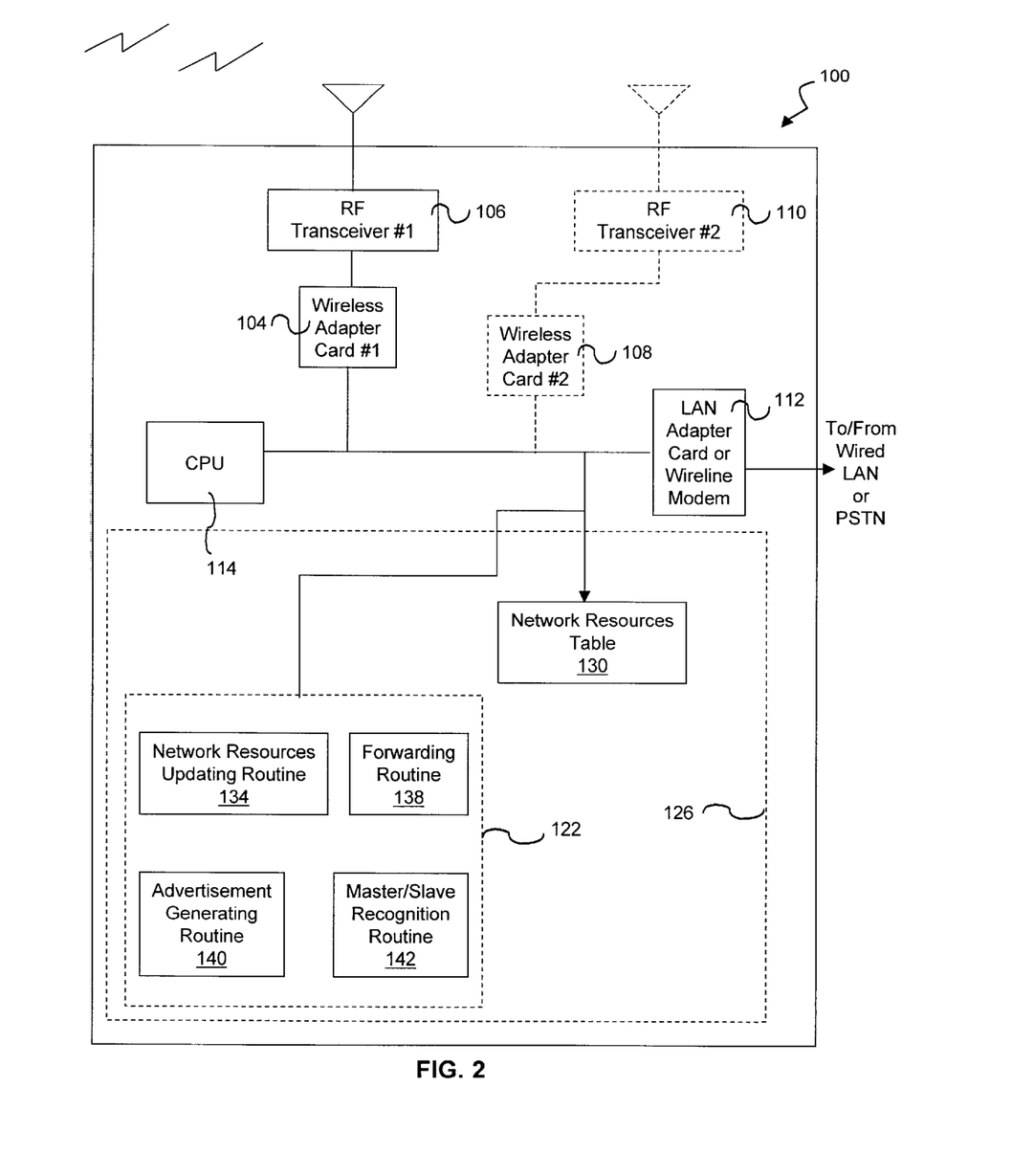
FIG. 2 is a block diagram illustratively representing the components of a wireless node and associated software configured in accordance with a preferred embodiment of the present invention.

FIG. 2 is a block diagram illustratively representing the components of a wireless node 100 and associated software configured in accordance with a preferred embodiment of the present invention. In a preferred implementation each wireless node 100 is capable of being configured for operation as either a master node or a slave node. Accordingly, unless otherwise indicated the following discussion should be considered applicable to both master and slave nodes. Referring to FIG. 2, the wireless node 100 may be in the form of an electronic device (e.g., a laptop or desktop computer, hand-held electronic organizer, or printer) containing a first wireless adapter card 104 and a first RF transceiver 106 disposed for communication in accordance with a first network communication standard. The wireless node 100 may also optionally include a second wireless adapter card 108 and a second RF transceiver 110 for communicating in accordance with a second network communication standard. The second wireless adapter card 108 and the second RF transceiver 110 may be included within the wireless node 100 when, for example, it is anticipated that the wireless node may participate in piconets operative in accordance with different network standards. For example, internetworking node S4 would preferably be configured with different wireless transceivers and associated adapter cards to the extent the first piconet 10 and second piconet 20 were governed by differing network communication standards. The wireless node 100 may also include a LAN adapter card 112 for facilitating communication with a wired LAN, or alternately a wireline modem for effecting communication through the PSTN.

Each wireless adapter card and transceiver is controlled by a CPU 114 operative to execute program instructions of the various software routines 122 stored in memory 126. Within slave nodes, a network resources table 130 is updated in response to internet management broadcasts by the master node of the applicable piconet. The network resources table 130 stores the network address and services offered by each wireless node within the piconet. In the case of internetworking nodes, these advertised services may include the services provided by a wireless node from a neighboring piconet in communication with the internetworking node. Within master nodes, the network resources table 130 is constructed by a network resources updating routine 134 on the basis of advertisements received from participating slave nodes within the applicable piconet.

Included among the software routines 122 within internetworking nodes is a forwarding routine 138 for forwarding messages to the wired LAN via the LAN adapter card 112, or to another wireless node via one of the wireless transceivers 106, 110 and associated wireless adapter card 104, 108. An advertisement generating routine 140 operates to generate the advertisements issued by the wireless node 100 which specify its network address and services offered. In connection with the entry of the wireless node 100 into a given piconet, a master/slave registration routine 142 functions to negotiate with other nodes of the piconet as to whether the wireless node 100 will assume the role of master or slave.

Figure 3:
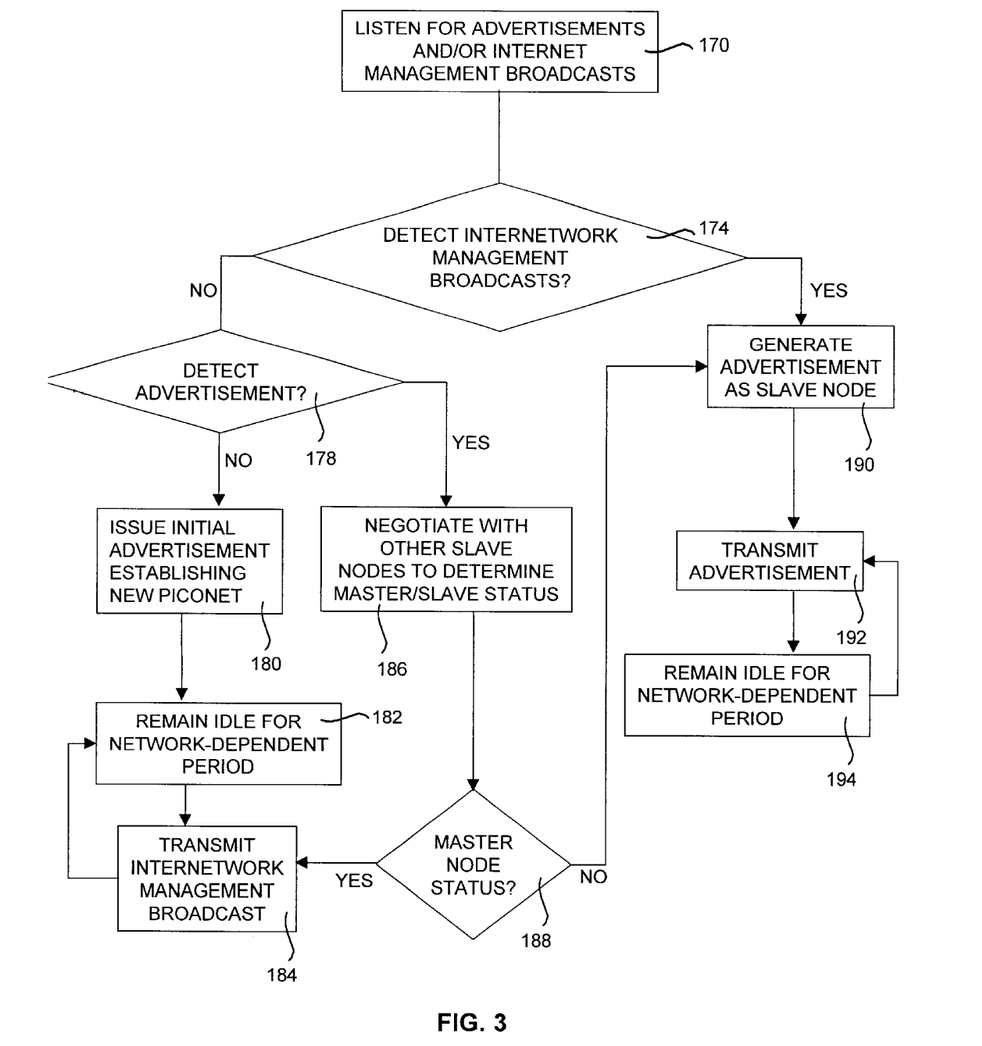
FIG. 3 is a flow chart representation of the procedures followed in connection with the transmission of internet management broadcasts by wireless nodes configured as master nodes, and the transmission of advertisements by wireless nodes functioning as slave nodes.

FIG. 3 is a flow chart representation of the procedures followed in connection with the transmission of: (i) internet management broadcasts by wireless nodes configured as master nodes, and (ii) advertisements by wireless nodes functioning as slave nodes. In step 170, a wireless node desiring to register within a piconet initially listens for the presence of advertisements or internet management broadcasts issued by wireless nodes associated with the piconet. If neither an internet management broadcast nor an advertisement is detected (steps 174 and 178), the wireless node issues an advertisement in order to initiate establishment of a piconet in the manner described above (step 180). Additional internet management broadcasts separated by network-dependent idle intervals (step 182) are then issued by the wireless node (step 184). If an internet management broadcast is not detected but an advertisement is detected (steps 174 and 178), the wireless node negotiates with any slave nodes issuing advertisements in order to institute the master/slave hierarchical arrangement described above (step 186). If as a result of this negotiation the wireless node is accorded status as a master node (step 188), it begins transmission of internet management broadcasts at network-dependent intervals (steps 182 and 184).

If it is determined that the wireless node is not to be a master node (step 188) or if internet management broadcasts are not detected (step 174), the wireless node generates an advertisement as a slave node (step 190). The wireless node then transmits advertisements (step 192) separated by network-dependent idle intervals (step 194), each such advertisement reflecting the network address of the wireless node and an array of services currently being offered.

Tables I and II below illustratively represent simplified network resources tables 130 respectively compiled by master nodes M1 and M2 in the context of an exemplary implementation of the network topology of FIG. 1. Specifically, in this exemplary implementation it is assumed a modem ("Modem1") is attached at node S1, a general use printer ("GP Printer") is attached at node S2, and a second modem ("Modem2") is attached at node S3. In addition, a printer ("S6 Printer") restricted for use by node S6 is attached at node S5.

Once all nodes become participating, the advertisements issued by each will reflect attachment of the applicable device. For example, node S2 will advertise capabilities of GP Printer and node S5 will advertise capabilities of S6 Printer. Upon accumulation of this information, the network resources table 130 compiled by node M1 will include the following entries:

TABLE I

Modem 1 via S1 direct
Modem 2 via S4 relay
GP Printer via S2 direct
S6 Printer via S4 relay.

Similarly, the network resources table 130 of node M2 will contain the following entries:

TABLE II

Modem 1 via S4 relay
Modem 2 via S3 direct
GP Printer via S4 relay
S6 Printer via S5 direct.

In the case where Modem1 is substantially identical to Modem2, the internet management broadcast of master node M1 will preferably only contain information pertinent to Modem1 and the broadcast of node M2 will only include information relating to Modem2. Under this condition, the internet management broadcast from node M1 will include:

Modem 1 via S1 direct
GP Printer via S2 direct
S6 Printer via S4 relay, while the internet management broadcast from node M2 will contain:

Modem 2 via S3 direct
GP Printer via S4 relay
S6 Printer via S5 direct.

As is indicated by the foregoing, node S6 can roam between the first and second piconets 10 and 20 and still be capable of printing at its "private" printer (i.e., S6 Printer).

Figure 4:
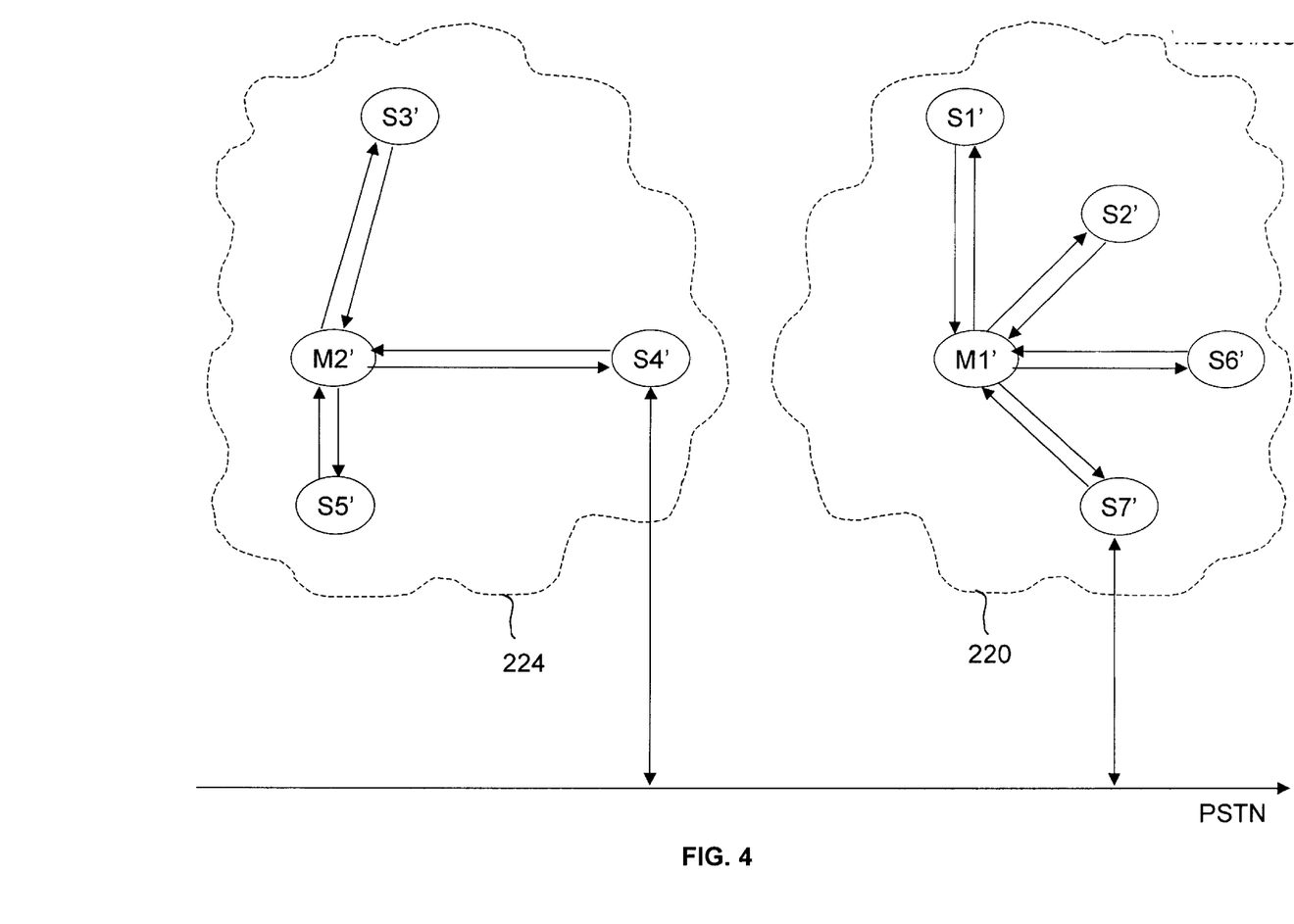
FIG. 4 illustrates an alternately preferred embodiment of the present invention in which first and second piconets each include nodes coupled to the PSTN.

FIG. 4 illustrates an alternately preferred embodiment of the present invention in which a plurality of wireless nodes form a first piconet 220 and a second piconet 224. The first piconet 220 is comprised of a master node M1' and slave nodes S1', S2', S6' and S7'. The second piconet 224 contains a master node M2' and slave nodes S3', S4' and S5'. Again, it is assumed that certain of the wireless nodes depicted in FIG. 4 may be mobile relative to one another. In the piconet architecture of FIG. 4, each slave node within the first piconet 220 is within the coverage area of master node M1' and each slave node within the second piconet 224 is within the coverage area of master node M2'. However, slave nodes within the first and second piconets 220 and 224 need not be within transmission range of other slave nodes within their respective networks.

Although the first and second piconets 220 and 224 do not share a common internetworking node, slave nodes S4' and S7' are linked by the PSTN. As was discussed above, internetworking node S4' may report on the availability of services within the first piconet 220 in its advertisement to master node M2'. Similarly, slave node S7' may report on the availability of services within the second piconet 224 in its advertisement to master node M1'. Accordingly, subject to the bandwidth constraints of slave nodes S4' and S7', the services offered by nodes within the second piconet 224 may be made available to nodes within the first piconet 220, and vice-versa.

Figure 5:
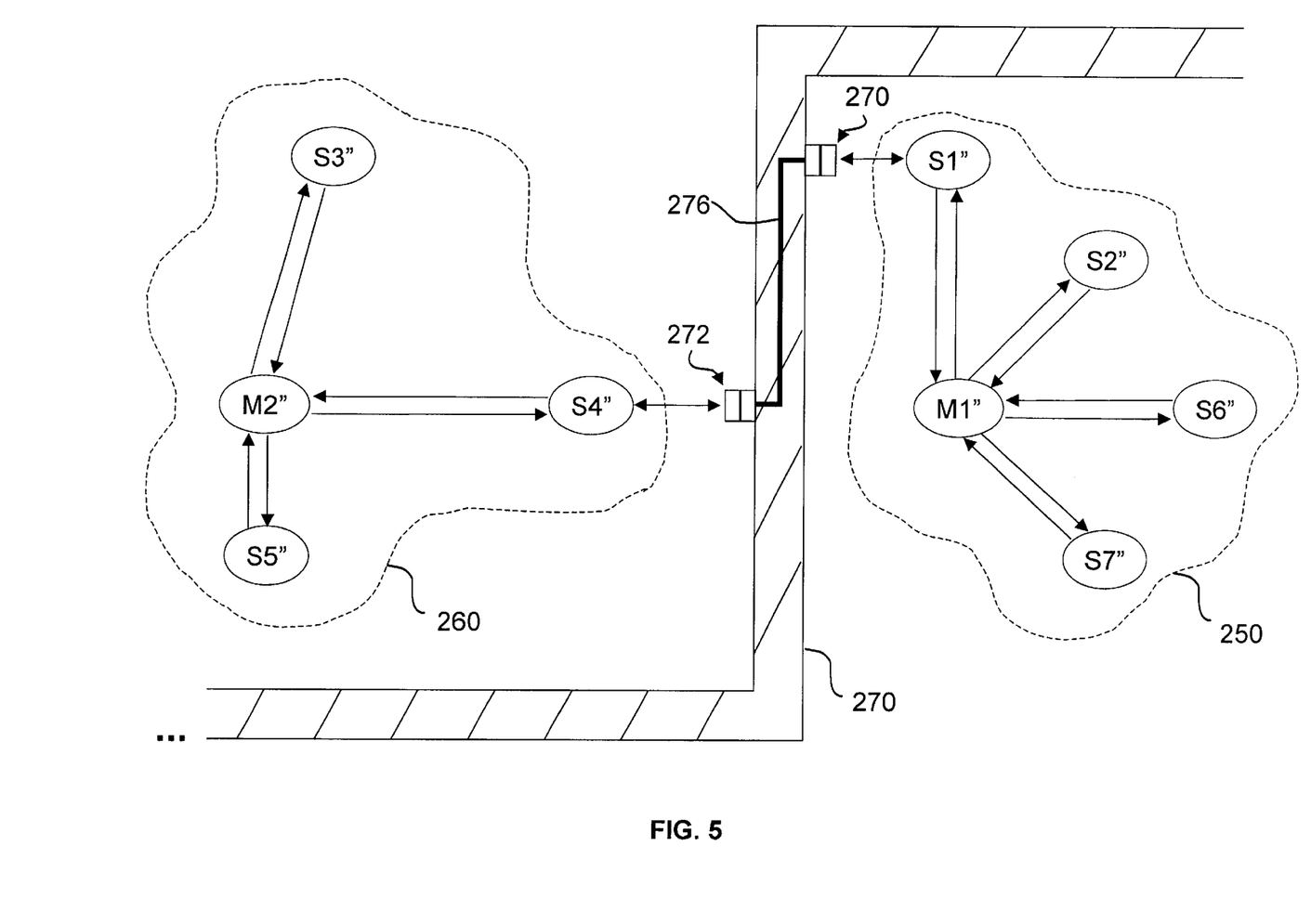
FIG. 5 is an illustrative representation of another alternately preferred embodiment of the present invention containing first and second piconets, each of which include a node coupled to a telephone link via a gateway unit.

FIG. 5 is an illustrative representation of another alternately preferred embodiment of the present invention containing a first piconet 250 and a second piconet 260. The first and second piconets 250 and 260 each include a set of potentially mobile wireless nodes physically separated by a wall or similar rigid structure 270. Referring to FIG. 5, the first piconet 250 is comprised of a master node M1" and slave nodes S1", S2", S6" and S7". The second piconet 260 contains a master node M2" and slave nodes S3", S4" and S5". In the piconet architecture of FIG. 5 each slave node within the first piconet 250 is within the coverage area of master node M1" and each slave node within the second piconet 260 is within the coverage area of master node M2".

Although the first and second piconets 250 and 260 do not share a common internetworking node, communication may be established between slave nodes S4" and S1" via first and second gateway units 270 and 272 and telephone line 276. In particular, the first gateway unit 270 is operative to convert over-the-air signals transmitted by internetworking node S4" in a predefined format (e.g., Bluetooth) into signals capable of being transported by telephone line 276 to gateway unit 272. Similarly, the second gateway unit 272 is operative to convert over-the-air signals transmitted by slave node S1" in a predefined format into RF signals for transport by telephone line 276 to gateway unit 270. The gateway units 270 and 272 also convert the RF signals from the telephone line 276 into over-the-air signals for transmission to slave nodes S1" and S4", respectively. In a preferred implementation the first and second gateway units 270 and 272 each include a PhoneNet adapter card or the like for conducting signals to and from the telephone line 276.

Although the above application has been described primarily with reference to specific embodiments, one skilled in the art can readily appreciate that the teachings of the present invention may be applied in other communication contexts. Thus the application is meant only to be limited by the scope of the appended claims.

What is claimed is:

1. An internetworked communication system comprising:
   a first wireless network including a first plurality of wireless nodes, each of said first plurality of wireless nodes transmitting an advertisement identifying its address and an address for each of a set of said first plurality of wireless nodes from which ones of said advertisements are received;
   a second wireless network including a second plurality of wireless nodes; and
   an internetworking node included within said first plurality of wireless nodes and within said second plurality of wireless nodes, said internetworking node including:
   means for receiving a first set of network information relating to said first wireless network from said first plurality of wireless nodes, said first set of network information identifying said first plurality of wireless nodes and services potentially available to said second plurality of wireless nodes; and
   means for transmitting, to one of said second plurality of wireless nodes, said first set of network information and an identity of said internetworking node.

2. The internetworked communication system of claim 1 wherein said internetworking node further includes:
   means for receiving a second set of network information relating to said second wireless network, said second set of network information identifying said second plurality of wireless nodes and services offered thereby; and
   means for transmitting, to one of said first plurality of wireless nodes, said second set of network information and an identity of said internetworking node.

3. The internetworked communication system of claim 2 wherein said interconnection node includes means for forwarding message information received from said one of said first plurality of wireless nodes to a first of said second plurality of wireless nodes.

4. The internetworked communication system of claim 1 wherein said one of said first plurality of wireless nodes is operative as a first master node, said first master node broadcasting information describing services offered by each of said first plurality of wireless nodes and services offered by said second wireless network.

5. The internetworked communication system of claim 4 wherein each of said first plurality of wireless nodes includes means for transmitting, to said first master node, an advertisement specifying its address and services offered thereby, said first master node storing information from each said advertisement within a first network resources table.

6. The internetworked communication system of claim 5 wherein a withdrawing node of said first plurality of wireless nodes includes means for transmitting, to said first master node, a revocation of its advertisement, said revocation causing said first master node to delete the advertisement associated with said withdrawing node from said first network resources table.

7. The internetworked communication system of claim 1 wherein said one of said second plurality of wireless nodes is operative as a second master node, said second master node broadcasting information describing services offered by each of said second plurality of wireless nodes and services offered by said first wireless network.

8. The internetworked communication system of claim 7 wherein each of said second plurality of wireless nodes includes means for transmitting, to said second master node, an advertisement specifying its address and services offered thereby, said first master node storing information from each said advertisement within a second network resources table.

9. The internetworked communication system of claim 1 wherein said internetworking node includes means for forwarding message information received from said one of said second plurality of wireless nodes to a first of said first plurality of wireless nodes.

10. The internetworked communication system of claim 9 wherein said internetworking node includes means for forwarding message information received from said first of said first plurality of wireless nodes to said one of said second plurality of wireless nodes.

11. An internetworking node included within a first wireless network having a first plurality of wireless nodes and within a second wireless network having a second plurality of wireless nodes, said internetworking node comprising:
   means for receiving a first set of network information relating to said first wireless network, said first set of network information identifying said first plurality of wireless nodes and services potentially available to said second plurality of wireless nodes, each of said first plurality of wireless nodes transmitting an advertisement identifying its address and an address for each of a set of said first plurality of wireless nodes from which ones of said advertisements are received;
   means for transmitting, to one of said second plurality of wireless nodes, said first set of network information and an identity of said internetworking node;
   means for forwarding message information received from said one of said second plurality of wireless nodes to one of said first plurality of wireless nodes; and means for forwarding message information received from said one of said first plurality of wireless nodes to said one of said second plurality of wireless nodes.

12. The internetworking node of claim 11 further including:
   means for receiving a second set of network information relating to said second wireless network, said second set of network information identifying said first plurality of wireless nodes and services offered thereby;
   means for transmitting, to said one of said first plurality of wireless nodes, said second set of network information and an identity of said internetworking node;
   means for forwarding message information received from said one of said first plurality of wireless nodes to said one of said second plurality of wireless nodes; and
   means for forwarding message information received from said one of said second plurality of wireless nodes to said one of said first plurality of wireless nodes.

13. The internetworking node of claim 11 further including means for transmitting, to a master node of said first wireless network, an advertisement specifying a network address and services associated with said internetworking node, said master node storing information from said advertisement within a network resources table.

14. The internetworking node of claim 13 further including means for transmitting, to said master node, a revocation of said advertisement causing said master node to delete said advertisement from said network resources table.

15. A method for establishing a first wireless network capable of internetworking with a second wireless network, said method comprising the steps of:

broadcasting, from a first device, a first network management message specifying an identity and an operating mode of said first node;

receiving, at a second device, said network management message;

transmitting, from said second device, a response message specifying an identity of said second device and characteristics of said second wireless network;

receiving, at said first device, said response message; and broadcasting, from said first device, a second network management message containing information relating to said characteristics of said second wireless network wherein said first device is included within a wireless network having a plurality of wireless nodes, each of said plurality of wireless nodes transmitting an advertisement identifying its address and an address for each of a set of said plurality of wireless nodes from which ones of said advertisements are received.

16. The method of claim 15 further including the step of forwarding, via said second device, message information originating within said first wireless network to said second wireless network.

17. The method of claim 15 further including the step of determining, based upon capabilities of said second device described in said response message, whether subsequent network management messages should be broadcast by said first device or by said second device.

18. An internetworked communication system comprising:

a first wireless network including a first plurality of wireless nodes, each of said first plurality of wireless nodes transmitting an advertisement identifying its address and an address for each of a set of said first plurality of wireless nodes from which ones of said advertisements are received;

a second wireless network including a second plurality of wireless nodes;

an interconnection network operatively coupled to at least one of said first plurality of wireless nodes and to at least one of said second plurality of wireless nodes, said one of said first plurality of wireless nodes issuing a first of said advertisements within said first wireless network, said first of said advertisements including information relating to characteristics of said second wireless network.

19. The internetworked communication system of claim 18 wherein said one of said second plurality of wireless nodes is disposed to issue an advertisement within said second wireless network relating to characteristics of said first wireless network.

20. The internetworked communication system of claim 18 wherein said interconnection network includes a gateway unit in over-the-air communication with said one of said first plurality of wireless nodes.

21. An internetworked communication system comprising:

a first wireless network including a first plurality of wireless nodes, each of said first plurality of wireless nodes transmitting an advertisement identifying its address and an address for each of a set of said first plurality of wireless nodes from which ones of said advertisements are received;

a second wireless network including a second plurality of wireless nodes; and an internetworking node in wireless communication with at least one of said first plurality of wireless nodes and in wireless communication with at least one of said second plurality of wireless nodes, said internetworking node including:

a receiver configured to receive a first set of network information relating to said first wireless network from said first plurality of wireless nodes over a wireless communication path, said first set of network information identifying said first plurality of wireless nodes and services potentially available to said second plurality of wireless nodes; and a transmitter operatively connected to said receiver.

22. The internetworked communication system of claim 21 wherein said transmitter is configured to transmit, to one of said second plurality of wireless nodes over a wireless communications path, said first set of network information and an identity of said internetworking node.

23. The internetworked communication system of claim 21 wherein said receiver is further configured to receive a second set of network information relating to said second wireless network, said second set of network information identifying said second plurality of wireless nodes and services potentially available to said first plurality of wireless nodes.

24. The internetworked communication system of claim 23 wherein said transmitter is configured to transmit, to one of said first plurality of wireless nodes over a wireless communication path, said second set of network information and an identity of said internetworking node.

* * * * *